Figure 1:
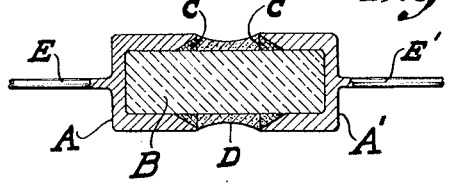

Jan. 25, 1938.  C. C. HOWER  2,106,249

FLAME SENSITIVE CURRENT CONTROLLING ARTICLE

Filed Sept. 27, 1933

INVENTOR:
C. C. HOWER
BY
Charles A. Lind
ATTORNEY.

Patented Jan. 25, 1938

2,106,249

UNITED STATES PATENT OFFICE 2,106,249

FLAME SENSITIVE CURRENT CONTROLLING ARTICLE

Charles C. Hower, Cleveland, Ohio, assignor to The Cosma Laboratories Company, Cleveland, Ohio, a corporation of Ohio Application September 27, 1933, Serial No. 691,190

14 Claims. (Cl. 201—76)

This invention relates to the art of electrical switches.

It particularly relates to a new and novel type of switch, which I designate as a "flame sensitive switch", which is distinguished from present types of switches by the complete absence of all moving parts, and by its dependence, for its operation upon the presence or absence of a flame, or its equivalent, as I shall describe.

Specifically, it relates to a new and novel composition of matter which is normally electrically non-conductive, and which when subjected to the conditions maintaining with a flame, becomes electrically conductive, and the combination of this composition of matter with means whereby electrical current may enter and leave it when in its conducting state, and other means, as I shall describe, whereby the assembly shall be capable of functioning as an electrical switch, being in the "on", or current carrying position when the active material is subjected to or placed within a flame, and in the "off" position in the absence of such flame.

While I recognize a number of applications for my "flame sensitive switch", one of the most important of its uses is in connection with pilot light safety controls, such as are common in gas and oil burning appliances.

By the term "pilot light safety control", I mean that portion of the mechanism of automatically controlled fuel burning devices by which the flow of fuel to the appliance is made dependent upon the presence, within the appliance of a flame capable of igniting that fuel, and which thus has for its purpose the prevention of the accumulation of unignited fuel within the appliance, with consequent explosion hazards.

In by far the preponderant number of such appliances the "pilot light safety control" takes the form of a fuel valve, actuated, directly or through the medium of electrical energy, by the mechanical effect of dissimilar materials under the influence of heat, the entire arrangement being so devised as to maintain the fuel valve in the open position as long as the heat of a small flame, known as the pilot light flame, is effective on a heat sensitive element, and to permit and maintain its closure in the absence of that heat.

Most modern, complete appliances are equipped with the electrically operated type, namely, a pilot light control consisting of a source of electrical current, a valve operable by such current, and, in series with both, a switch actuated to its closed position by the effect of heat upon a thermo-sensitive unit located within the appliance and in proximity to the pilot light flame.

These thermo-sensitive units vary very widely in design and construction, but, so far as I am aware, all operate on the principle of producing mechanical movement by the correlated use of metals or other materials having different thermal coefficients of expansion, and magnifying the movement thus produced by mechanical means to a sufficient degree to make it effective in operating the switch associated therewith.

Such devices are initially expensive to produce; require installation and adjustment by one skilled in their use; are subject to distortion, warping and other causes of failure, and finally, by their dependency upon heat, are greatly influenced by the residual heat in the appliance in which they are used, thus permitting, in many cases, the continued flow of unignited fuel to the appliance after extinction of the flame, with consequent explosion hazards.

Various means have been employed to avoid these latter limitations, and one of these has taken the form of amplifying a minute current, carried through the pilot flame itself to operate a delicate relay which in turn permits flow of electrical energy of suitable magnitude, to an electrically operated fuel valve.

In another related type of equipment the flow of current from a photo-electric cell, actuated by the light from the pilot flame, has been similarly used.

Such devices have found only limited use, due to their prohibitive cost.

As applied to a pilot light safety control, my flame sensitive switch accomplishes new and novel results, not only by reason of the elimination of all thermo-sensitive units with their described limitations, but also by reason of the fact that being sensitive, for operation, to flame and not to heat, it completely eliminates those explosive hazards for which pilot light safety controls have hitherto been only partially effective.

Furthermore I secure these advantages at a fraction of the cost of the thermo-sensitive units now in use, and in fact, at such low cost that in the event of breakage, damage, or other failure my switches are discarded and replaced as in the manner common to the use of electrical fuses.

In carrying out my invention, I make use of the well known principle that certain electrically non-conductive oxides of metals may be readily reduced to their respective, electrically conductive metals by the reducing conditions maintaining in a flame, and that this reaction may be reversed by atmospheric oxidation.

The object of my invention is to provide means whereby that principle may be incorporated in a "flame sensitive switch", which shall be operable by the presence or absence of a flame; which shall be capable of virtually an unlimited number of reversals; which shall be permanently capable of carrying the load for which it was designed; which shall be capable of modification with respect to its speed of action, and which, finally, shall be capable of carrying sufficient electrical energy for the operation of electrical devices connected directly in series with it.

Figure 2:
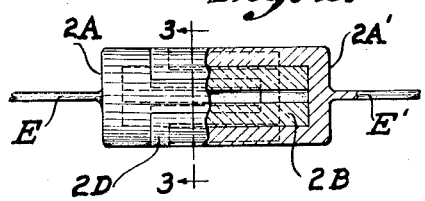
Figure 3:
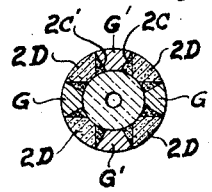
Figure 4:
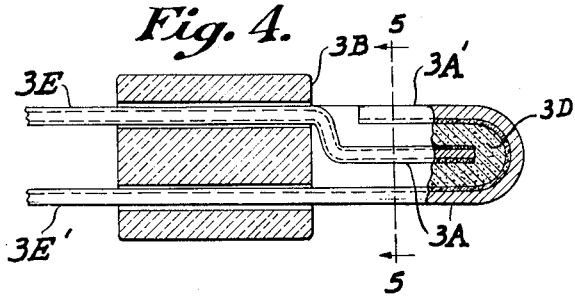
Figure 5:
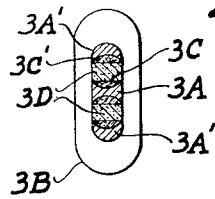
Figure 6:
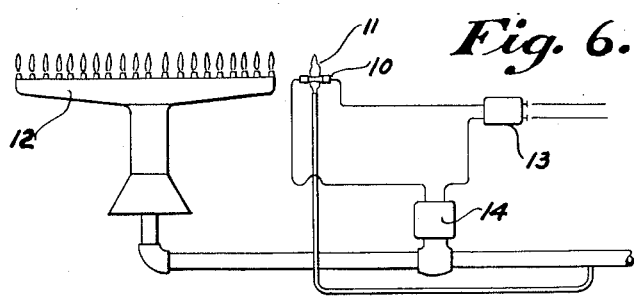

In the accompanying drawing, I have indicated a number of forms which the improved switch may take. Thus, Fig. 1 is a longitudinal section of one form of switch embodying the present invention; Fig. 2 is an elevation, with parts in section, of another form of switch; Fig. 3 is a cross section on line 3—3 of Fig. 2; Fig. 4 is a longitudinal section of still a third form of switch; Fig. 5 is a cross section on line 5—5 of Fig. 4, and Fig. 6 indicates generally how the improved switch may be applied in a control circuit of a gas burning appliance. Figs. 1 to 5 inclusive are drawn on an enlarged scale to more fully show the special features of construction.

I shall now describe one example of a composition of matter which I shall hereafter refer to as "flame sensitive material", which is satisfactory for use in my flame sensitive switches, and one means for incorporating it in a flame sensitive switch and I shall subsequently describe modifications which I may desire to make in my flame sensitive material, the principle upon which it operates, and a number of means in which it may be used in switches of the character described.

In producing this example of my "flame sensitive material", I take 45 parts by weight, of metallic tin powder, of about 200 to 300 mesh, and 55 parts by weight, of stannic oxide, and I grind these materials together to insure uniformity and complete dispersion of the one with the other.

To 96 parts by weight of that mixture, I now add 2 parts by weight, of ground soda glass, of about 200-300 mesh, and 2 parts by weight, of magnesium oxide, of at least 200 mesh fineness, and again grind the mass to insure complete and uniform dispersion. To the so completed mixture, I add sufficient water to make a smooth paste, whereupon the material is ready for use, as I shall describe.

One example of the manner in which I use my flame sensitive material in producing a flame sensitive switch is shown by Fig. 1.

In describing this example, I shall give dimensions, in order that the current capacity of my switch be perfectly clear.

In Fig. 1, A and A' are two chromium steel terminal caps, $\frac{3}{8}$" outside diameter, $\frac{7}{8}$" overall length, bored out to receive and have cemented therein a refractory bar, B, $\frac{1}{4}$" in diameter and $\frac{3}{4}$" long. E and E' are leads to conduct current to and from the switch. I cement the bar, B, into the caps, A and A', using any suitable refractory cement for the purpose. I subsequently bake or burn the assembly to insure a permanent and secure mechanical joint between the three members.

I next provide a special treatment for the junction zones between the metal ends, caps, or other terminals by which the current flows to and from my switches, and the flame sensitive material disposed therein.

I have found that it is desirable and in many cases essential that I provide these contact points with a material which will at once adhere to the terminals and provide a material sufficiently similar to the flame sensitive material to blend therewith and thus provide a means to prevent sparking, burning, and other difficulties at these points.

In making these transition zones, which are indicated by C and C', in Fig. 1, I provide a mixture of the following:

| | Parts |
|---|---|
| Comminuted tin | 95 |
| Ground soda glass | 5 |

I mix and grind these materials together to such degree of fineness as to pass preferably a 200 mesh screen.

To this so prepared mixture, I now add a saturated water solution of borax, sufficient in quantity to make a thin smooth paste, which I then apply to the edges of the terminals as shown at C and C' in Fig. 1.

I have found that after use, this material is chiefly metallic and that it adheres very tenaciously to the metal points, and furthermore, that my flame sensitive material blends into it in such way as to avoid the above described difficulties.

I do not limit myself to this particular composition, but define my requirement in this respect as a material which; when applied to the metal terminals, shall adhere thereto permanently and which shall be non-oxidizable in character and shall be electrically conductive, and which finally shall be sufficiently closely related, both physically and chemically, to my flame sensitive material, as to provide a permanent transition zone thereto.

I now permit the joint mixture to dry normally, whereupon I next apply the above described parts of "flame sensitive material" to the position between the transition zones, C and C', the flame sensitive material being applied in the manner shown at D.

The paste of flame sensitive material is then air dried, and the entire switch is slowly heated to a dull red heat to drive off any residual or combined water, whereupon it is ready for use.

A flame sensitive switch so constructed, having an exposed length of flame sensitive material of about $\frac{1}{4}$", and bearing this material to the extent of about $\frac{1}{32}$" thick at the point "D", has a current carrying capacity of about 1 ampere, and is capable of use within the range 5 to 110 volts.

In the foregoing example, I have set forth in detail one example of the production of my flame sensitive material, and one example of the manner in which it may be incorporated in an assembly to produce a flame sensitive switch.

I do not wish to be limited in either respect to that example, for I recognize that both the composition of the flame sensitive material and its application may and necessarily will be varied widely to meet a wide variety of uses.

In order that the nature and scope of my invention be clear, I shall now describe the operating principle upon which it depends. For purposes of this description, it is necessary that I refer to the available technical data, particularly with reference to the heat of formation of various oxides as being an inverse indication of their ease of reduction, and to the effect of temperature upon the electrical conductivity of such substances.

I use these references as a necessary basis for describing a principle, but I do not wish to be limited to the data so established, for in many cases, it is not sufficiently complete, and in others, the various sources are not in agreement.

The principle upon which my flame sensitive switch operates and depends is the reduction of electrically non-conductive bodies, by the action of the reducing atmosphere of a flame, to electrically conducting substances, and the subsequent reconversion of these conducting substances to non-conducting substances, by the action of the constituents of air, upon the removal of the flame.

In the predominant number of cases, I believe the reduction to be effected by the carbon monoxide in the flame, although I do not limit myself to the presence of such material, since I am well aware that other reducing substances, such as hydrogen or hydrocarbons, exist in many flames.

In any case, the reaction upon which the flame sensitive material above described depends may be expressed by the following equilibrium equation:—

$$SnO_2 + 2CO \rightleftarrows Sn + 2CO_2$$

My observations have led to the conclusion that a minimum temperature of about 400° to 500° F. is necessary to cause the above reaction to proceed to the right, and I believe that the rate of progress, above that temperature, is proportional to the concentration of carbon monoxide in accordance with well established chemical principles governing such reactions.

Accordingly, not only the nature of the flame, but also the position of my switch within it, will determine the speed of "closing" of the switch, as will be clearly understood by those skilled in the related arts.

While I believe the above reaction to be true to the case, I do not limit myself to that statement as a fact, for I recognize that the reaction may, at least in some cases, proceed only to the formation of stannous oxide, in accordance with the equation, $$SnO_2 + CO \rightleftarrows SnO + CO_2$$

in which case I believe that qualitatively equivalent effects would be produced.

While I may use several different materials as the basic flame sensitive substance in my flame sensitive material, I prefer to use stannic oxide for the reason that I have found that the ease of reduction and subsequent oxidation is satisfactory for my purpose; that the material both in the form of oxides and metal is for all practical purposes non-volatile; and finally because the temperature coefficient of electrical conductivity shows characteristics which make the material satisfactory to use, all as I shall describe.

Referring now to the ease of reduction and subsequent oxidation, I have considered the available data on a total of 63 metals whose oxides might possibly be used for this purpose and I have particularly experimented with a number of such metals and correlating the available data with the results of my experiments, and assuming the accuracy of the data which I have found in recognized sources, I have come to the conclusion that the heat of formation per gram of an oxide or nitride is a measure of its satisfactory character from this standpoint.

In the following table, I show a number of oxides which can be used for making my flame sensitive material and tabulate with them the heat of formation per gram, in order to facilitate the explanation of my principle on the one hand and to serve as data on the other.

| Symbol | Heat of formation calories per gram |
|---|---|
| CuO | 470 |
| WO₃ | 610 |
| Ta₂O₅ | 680 |
| NiO | 770 |
| SnO₂ | 910 |
| FeO | 915 |

Referring to the above tabulations, which include some of the oxides with which I have experimented, I have found that cupric oxide reduces very easily to the conductive metal and that tungstic oxide reduces to the conductive state with somewhat more difficulty and that the difficulty of reduction within that series increases in the order shown and in general, directly as the heat of formation per gram of the oxide.

I have also found that in a general way, a flame sensitive material made with ferrous oxide reverts, upon the removal of the flame, to the non-conductive state more readily than the oxides having a lower heat of formation per gram.

I have furthermore found that oxides, such as chromic oxide, having a heat of formation of 1600 calories per gram, do not reduce, in a flame, to the conductive form and additionally I have found that oxides having a lower heat of formation than cupric oxide, do not, readily and with certainty, upon removal of the flame, reoxidize to the non-conducting form.

Accordingly, and within the limits of accuracy of the available data, I choose as the basic flame sensitive substance for my sensitive material an oxide, nitride, or other reversible material which has a heat of formation per gram lying between about 250 and 1500 calories.

I do not wish to be understood as stating that any oxide, nitride, or other compound reversible in the described sense, will fulfill my requirements, for in this portion of my description, I refer only to the ease of reduction and subsequent oxidation or other equivalent reversal, for I recognize other definite requirements as I shall describe.

I have above set up the requirements that the substance or substances I use in my flame sensitive material shall not be volatile and the necessity for this requirement will be clear when it is understood that switches produced by the use of my flame sensitive material may in many cases be permanently installed in a flame, and consequently any tendency whatever to sublime or otherwise volatilize, particularly in the reduced condition, will necessarily decrease the life and utility of such devices.

I have found that an element as prepared above by the use of stannic oxide and tin is permanent over long periods, within a flame.

On the other hand, I have found that cadmium as an example of a metal having a heat of formation of its oxide of 520 calories per gram volatilizes at a relatively high rate when submitted to normal flame temperature.

I have found that when I use nickel or cobalt, that volatilization occurs to some extent, through the formation of their respective carbonyls.

I have found that tungstic oxide, as an example of the oxide of an extremely high melting metal, is dissipated somewhat from one of my flame sensitive switches when it is used as the basic sensitive material therein.

I have not found data which I consider reliable as a basis upon which to define the limits of the volatility or other tendency toward dissipation of my material.

A material suitable for the basic substance in my flame sensitive material, must be substantially non-volatile and permanent when continuously subjected to a flame, of the character in which they are to be used.

I do not exclude such oxides as tungstic oxide and nickel oxide for the reason that I believe that they will be permanent as described in some types of flames and under some conditions.

I will now refer to the temperature coefficient of electrical conductivity of the oxides or other substances which I use for the basic substance in my flame sensitive material.

It is well known that practically all oxides show an enormous increase in electrical conductivity with an increase in temperature and I shall cite in the following tables the available data on stannic oxide and cupric oxide in order that my explanation of this particular requirement be clear.

| Stannic oxide | | Cupric oxide | |
| --- | --- | --- | --- |
| Temp. °F. | Resistance | Temp. °F. | Resistance |
| 680 | 3550 | 150.8 | 74,560 |
| 932 | 1060 | 314.6 | 5,930 |
| 1292 | 1050 | 725 | 96.2 |
| 1652 | 29 | 1144 | 5.87 |
| 1940 | 5 | 1351 | 1.455 |
| 2192 | 1.2 | 1729 | .196 |
| | | 1900 | .021 |

Referring to the above tables, it will be seen that no practical increase in the conductivity of stannic oxide occurs until a temperature lying between 1300 and 1600 degrees Fahrenheit is reached, whereas a marked increase in the conductivity of cupric oxide occurs at about 725° F.

The preferred characteristic of an oxide satisfactory for my flame sensitive material is that the temperature at which it shows a marked increase in electrical conductivity shall be as high as possible and I shall now describe my reasons for that requirement, and I shall use cupric oxide as example and the above data for purposes of description.

If I use cupric oxide in the simple form of flame sensitive switch which I have shown in Fig. 1, as example, and if I then place that switch within a typical flame, the temperature of certain portions of the flame sensitive material will almost immediately rise to the temperature of the flame, while other portions will remain substantially cold.

It will be clear that upon arriving at such conditions the hot portions, which may be very small, immediately become sufficiently conductive to afford a partial path for the passage of electrical current. It will be further clear that the passage of such current immediately heats up the portions so acted upon, with a consequent greater localized flow, a condition which immediately results in the flow of practically the entire current through the described portions, consequently giving rise to the destruction of the material at that point by melting or arcing.

I may overcome this difficulty by the mechanical design and position of the flame sensitive material which has these characteristics, and I generalize that when I use a flame sensitive material having such characteristics, it shall be so disposed and so arranged as to present to the flame a film or other body which will attain a uniform heat throughout.

For example, I have found that I may make a relatively satisfactory flame sensitive switch for the control of feeble electrical currents by depositing a thin film of copper on a refractory bar, for example, subsequently oxidizing it to cupric oxide, and then supplying that assembly with suitable terminals.

In this case, the thickness of the film and the general character of the refractory are related, as will be understood, in such way that the film almost instantly attains the reduced condition, without a sufficient long period of time in the heated oxidized condition to permit the flow of current as I have described.

On the other hand, and for reasons which will be clearly understood from my above data and statements, I have found that I may make a thin shell of cupric oxide in the form of a cylinder with or without the addition of agents to increase its porosity, and that such a shell, preferably mounted within terminals, which are also hollow, will perform with a fair degree of satisfaction for the transmission of relatively larger current, but I recognize that such a device is largely unpractical by reason of the difficulty of manufacture and the fragility of the product.

It will be understood that I do not limit myself to an oxide or other compound having the above described temperature-resistance characteristics for I realize that various mechanical means, such as I have described, and others of a similar nature, can be used to obviate or minimize the difficulties arising from the failure of the material to meet the requirements as set up by my preface.

My preference in the use of the oxide of tin will now be clear from the above tabulation of its electrical characteristics as related to temperature and I have found in fact that I do not encounter serious trouble unless the oxides which I use begin to show marked practical increase in conductivity at a temperature about 500° below the temperature of the flame in which they are to be used.

Having now described the nature of the basic substance which I prefer and which I require for my flame sensitive material, I will now describe modifications which enhance its utility.

In my above described procedure, I have stated that I prepare my basic flame sensitive substance by mixing 45 parts of comminuted metallic tin with 55 parts of stannic oxide.

I have found, however, that when I use stannic oxide alone with powdered glass and magnesium oxide as described above, and subject the material so prepared to a flame for relatively long periods of time, it operates with a certain degree of satisfaction.

I have come to the conclusion that such a mixture ultimately arrives at a condition which I describe as an equilibrium emulsion of finely divided tin in stannic oxide, having approximately the above stated composition, and accordingly, I prefer to prepare this emulsion for use in my switches, rather than use stannic oxide only, for I thus avoid many uncertainties and irregularities which result if I use stannic oxide only, without the addition thereto of above mentioned comminuted tin.

In the above described example of my "flame sensitive material", I have used about 2% of ground soda glass. My purpose in adding this material is to have it serve as binder and hardening agent for the other constituents present, and thus impart strength and mechanical permanency to the metal-oxide mixture when subjected to heat.

While I have found soda glass to be satisfactory for the specific mixture referred to, I do not limit myself to its use for the purpose described, for I have found that many other substances, such as various refractory cements, various silicates, borates, and minerals of similar character may be used for the purpose.

My requirement for this binding and hardening material is that it shall be of such nature as to be effective in as small quantity as possible, in rendering the mixture permanently mechanically strong, while offering the minimum resistance to the flow of current.

In the case of the use of soda glass, I have found that if I use less than about ½% when based on the weight of the mixture, I do not secure sufficient strength and hardness, whereas if I use as much as 5%, I encapsulate the various elements of the mixture to such degree as to impair the operability of the switch.

These limits will naturally vary with the nature of the binder, and the nature of the flame sensitive material.

Furthermore, in the above described example I have used about 2% of magnesium oxide. My purpose in adding this material, or its equivalent, is to have it act as inhibitor to the coalescence or particle growth of the metals or other conductive substances produced by reduction, during long sustained periods in the reduced condition.

In order that this effect may be clear, I will explain that if I prepare a tin-tin oxide flame sensitive material in accordance with the example given, and do not add magnesium oxide or the equivalent, the effect of a prolonged period in a reducing atmosphere is the development of relatively large droplets of tin, which ultimately fall from the material, and thus cause its failure.

In case I use metals whose melting points are above the temperature of use, and do not use a material to prevent it, grain growth occurs in the metal particles resulting from long periods at relatively high temperatures under reducing conditions, with consequent impairment of the operation of the switch.

The limits to the amount of such material, as also its nature, are not sharply defined.

I have used 2% magnesium oxide in the example given, for the reason that such concentration provides optimum satisfaction under those particular conditions, a lower concentration permitting, to some extent, the effects I have described, and a higher concentration, giving rise to limitations in the conductivity.

In this example, I prefer to use between ½ and 5% of magnesium oxide or equivalent, but I do not so limit myself, for I recognize that other flame sensitive compositions which I shall describe, will require other materials in other concentrations.

In general, the purposes set forth are best attained by the use of refractory oxides, not reducible under the conditions of use, and preferably impalpably fine. Examples are calcium oxide, aluminum oxide, etc.

In many cases I do not require the presence of such dispersion maintaining substances and in other cases, by virtue of the nature of the materials used, I do not require any binding substances such as the glass or other materials described.

I have found that I may greatly increase the conductivity of my flame sensitive material and may modify its reversal time by the use therein of a dispersion of a non-oxidizable metal of the character of platinum or palladium.

In the event I desire to make a switch which will, for its size and construction, carry the maximum amount of current, I saturate the material with a carefully controlled solution of one of the noble metals.

Thus in the case described, I have found that if I saturate my mixture of tin and its oxides, glass and magnesium oxide, with a sufficent solution containing .001 gram palladium or platinum per cubic centimeter to make it a thin smooth paste, instead of water as I have described for the purpose, I thereby greatly increase its electrical conductivity, decrease the flame time required for maximum conductivity, and slightly increase the time required for reversing through the non-conductive stages.

Specifically, I normally use 1 part by weight of such palladium solution to 2 parts of my mixture.

I have found that my mixture is exceedingly sensitive to the presence of such noble metal dispersions. Thus, if I use a solution containing .003 gram of palladium or platinum per cubic centimeter, I still further increase the rate at which my switch reaches its maximum conductivity, increase the capacity, and materially increase the time required for reversal through the non-conducting condition.

I do not limit myself to platinum, palladium or other non-oxidizable metals for this purpose, for I have found that the addition of an oxide such as cupric oxide in varying proportions will accomplish the same effect.

I define my addition agent as one capable of providing either a permanent metallic dispersion such as platinum or palladium, or one capable, by virtue of its ease of reduction, of providing such a dispersion during the earliest stages of the reduction by the flame.

I will now describe several other means by which my flame sensitive material may be adapted to suitable terminals to make assemblies suitable for flame sensitive switches.

In Fig. 2, I show one type of switch which has certain advantages by reason of increasing the path through which the current flows and thus increasing the conductivity and capacity of the switch. In this form of switch the terminals 2A and 2A' are formed in the shape of a disc or cap, having protruding therefrom two or more parallel legs, G and G'. Closely fitting in these legs is a refractory rod 2B interposed to support mechanically the terminals 2A and 2A' with reference to each other and to provide a limiting depth to the flame sensitive material D for the reasons I shall describe. The legs G and G' are preferably undercut and treated with the above described joint mixture, as shown at 2C and 2C' in Fig. 3. The flame sensitive material 2D is applied as shown between the four legs thus arranged.

Fig. 4 shows another means by which my sensitive material may be adapted to cooperate with terminals to make a flame sensitive switch. In Fig. 4, 3A and 3A' are terminals, supported with reference to each other in any suitable means, as by a refractory block 3B, and terminating in any type of suitable terminals as 3E and 3E'.

The terminals 3A and 3A' are coated with the above described joint mixture at the surface 3C and my flame sensitive material is filled in between them as shown as 3D.

I have described three types of adaptation of my flame sensitive material to cooperate with suitable terminals for the formation of a switch therefrom and having purposes and characteristics described.

It will be clear to those skilled in the art that an almost unlimited number of modifications in design, construction, and size are possible, and these will be adapted to the particular application required.

In making these various adaptations I have found several requirements which must in all cases be realized and related to the flame sensitive material to be used.

Since the reversal of my switch, by which I mean its becoming non-conductive, depends upon atmospheric oxidation of the conductive material, and since oxidation of material such as I have designated depends upon a certain amount of heat, the design of my switch must always incorporate such heat capacity either within the material itself or the terminals or other parts thereof, or cooperate with such outside agencies as to maintain the flame sensitive material at a sufficient temperature for a sufficient period of time to permit, upon removal of the flame, its oxidation to the non-conductive form.

I accomplish this result by properly relating the character of my flame sensitive material, by which I mean its sensitivity to reduction and oxidation, to its porosity and depth, and finally, to the heat capacity of the entire assembly.

In the examples of my flame sensitive switch shown in Figs. 1 and 2, this effect is brought about by the use of the refractory bar which I have shown and described, in cooperation with the terminal ends.

In the example shown by Fig. 4, I depend on the heat capacity of the terminals alone, and make them sufficiently heavy to accomplish the purpose set forth.

It will be clear to those skilled in the arts involved that this heat capacity of the assembly must be directly proportional to the depth and density of my flame sensitive material, and inversely proportional to its sensitivity to reduction and oxidation, and that each of these variables may be used to vary the characteristics of my switches.

I do not limit myself to integral parts of the switch assembly to accomplish the described purpose, for I may in some cases prefer an outside means to hold its temperature at the desired degree for the necessary period of time, and in such cases, I may use a small heating coil, as example, placed around or in proximity to the switch.

It is in all cases essential that a definite relation, which will be clear from the foregoing, but which is incapable of general expression, must maintain between the nature of the flame to be used; the sensitivity of the flame sensitive material to reduction and oxidation; the thickness or body of the sensitive material and its porosity; the characteristics of the oxide or other non-conducting bodies with reference to its increase in conductivity with an increase in temperature; and finally, the heat capacity or equivalent outside means by which the material will be maintained; this relation being in all cases established in such way as to give rise to a sufficient and predetermined period of time and temperature to permit the sensitive material to reverse to the non-conducting condition upon removal of the flame or other reducing atmospheres.

In most cases, I prefer to make the layer of flame sensitive material about $\frac{1}{32}$ to $\frac{1}{16}$ inch thick for I have found that in most cases such a body will, when suitably porous, reduce to a highly conductive condition and reversely, will readily oxidize or otherwise react with atmospheric gases to the non-conductive condition.

These requirements and relations will be clearly understood by those skilled in the art, as will also the utility of this stated principle in determining or modifying the operation of my switches.

Having now described my flame sensitive switch and the manner in which it is produced I will describe a typical circuit in which it is used.

In Fig. 5, 10 is a flame sensitive switch mounted within a pilot light 11 located adjacent a gas burner 12. 13 is a transformer connected in series with the switch 10 and with a solenoid valve 14, the latter being arranged to open when current passes through switch 13 and to close in the absence of such current.

From this description and drawing it will be clear that when the pilot flame 11 is present, the principal fuel valve 14 will be opened thus permitting the flow of fuel to the burner 12. When the pilot light 11 is extinguished the valve 14 closes, thus preventing the flow of fuel to the burner C and consequently in this typical case preventing the flow of unignited gases to a furnace for example, thus preventing the hazards incident to such flow.

It will be understood that I offer this description of a typical circuit only as a matter of example to demonstrate the general character of utility of my flame sensitive switch and to demonstrate its range or utility.

Other installations will be obvious to those skilled in the arts.

Having now described my invention, what I claim is:

1. A flame sensitive current controlling article arranged within a space normally occupied by a flame and comprising a material which is normally electrically non-conducting, which becomes electrically conducting when placed within a flame, and which upon removal of the flame reverts to a non-conducting condition by the action of atmospheric gases on it, and means for sustaining its temperature, after the removal of the flame, at a sufficient degree and for a sufficient period of time to permit its reaction with atmospheric gases to result in its reversal to the non-conducting form.

2. A flame sensitive current controlling article arranged within a space normally occupied by a flame and comprising a material containing a metallic oxide having a heat of formation of between 250 and 1,500 calories per gram, said oxide being capable of yielding an electrically conductive material upon reduction; said oxide or its reduction product being substantially nonvolatile when subjected to the continuous action of a flame; said oxide being characterized by exhibiting no practical increase in electrical conductivity when used in the manner described, below a temperature 500° F. below the temperature of use, in combination with means whereby electrical current can enter and leave the material when in its reduced state.

3. A flame sensitive current controlling article arranged within a space normally occupied by a flame and comprising a plurality of electrically conducting terminals, permanently supported with reference to each other, and having disposed therebetween, a material which is normally electrically non-conductive but which becomes conductive in the presence of heat and a reducing atmosphere, such material having such depth and porosity as to permit its reduction to the conductive state when placed within a flame, and the entire assembly having such heat capacity as to continue to supply heat of sufficient degree to such material for a sufficient period of time to permit its oxidation, by atmospheric oxygen, to the non-conductive state, upon removal of the flame.

4. A "flame sensitive switch" arranged within a space normally occupied by a flame and comprising a material containing a metallic oxide having a heat of formation of between 250 and 1500 calories per gram, said oxide being capable of yielding an electrically conductive material upon reduction; said oxide and its reduction products being substantially non-volatile when subjected to the continuous action of a flame; said oxide being characterized by exhibiting no practical increase in electrical conductivity when used in the manner described, below a temperature 500° F. below the temperature of use, in combination with means whereby electrical currents can enter and leave the material when in its reduced state and means for sustaining its temperature after the removal of the reducing atmosphere, at a sufficient degree and for a sufficient period of time to permit its reaction with atmospheric oxygen to result in its reversal to the non-conducting form.

5. A flame sensitive current controlling article, comprising a material containing an oxide of tin in combination with means whereby electrical current can enter and leave the material when in its reduced state.

6. A flame sensitive current controlling article, comprising a material composed of an emulsion of finely divided tin and tin oxides in combination with means whereby electrical current can enter and leave the material when the tin oxides are in their reduced state.

7. A flame sensitive current controlling article, comprising an emulsion of between 30 and 70% finely divided metallic tin with about between 70 and 30% tin oxide in combination with means whereby electrical current can enter and leave the material when the oxide is in its reduced state.

8. A flame sensitive current controlling article, comprising a material containing a metallic oxide having a heat of formation of between 250 and 1500 calories per gram, in combination with a dispersion of a non-oxidizable metal, such material being in combination with means whereby electrical current can enter and leave the material when the oxide is in its reduced state.

9. A flame sensitive current controlling article arranged within a space normally occupied by a flame and comprising a material containing a metallic oxide having a heat of formation between 250 and 1500 calories per gram, said oxide being capable of reduction to an electrically conductive material, in combination with a sufficient amount of a non-reducible refractory substance to prevent the coalescence of the particles produced by reduction, in combination with means whereby electrical current can enter and leave the material when the oxide is in its reduced state.

10. A flame sensitive current controlling article, comprising a material consisting of between about 35 and 75% stannic oxide; between 65 and 25% finely divided tin; between about ½ and 5% binding material; between about ½ and 5% of a non-reducible refractory oxide in combination with means whereby current can enter and leave the material when the stannic oxide is in its reduced state.

11. A flame-sensitive material comprising a metallic oxide, a dispersion of finely divided oxidizable metal, and a dispersion of finely divided non-oxidizable metal.

12. A flame-sensitive material comprising a metallic oxide, a dispersion of finely divided oxidizable metal, a dispersion of finely divided non-oxidizable metal, and a vitreous binder.

13. A flame-sensitive material comprising stannic oxide, a dispersion of finely divided non-oxidizable metal, a dispersion of finely divided irreducible oxide, and a vitreous binder.

14. A flame-sensitive material comprising stannic oxide, finely divided metallic tin, a dispersion of finely divided non-oxidizable metal, a dispersion of finely divided irreducible oxide, and a vitreous binder.

CHARLES C. HOWER.